US012615070B2

(12) United States Patent
Zou et al.

(10) Patent No.: US 12,615,070 B2
(45) Date of Patent: Apr. 28, 2026

(54) RADAR SIGNAL FOR USE IN MOBILE COMMUNICATION EQUIPMENT

(71) Applicant: Telefonaktiebolaget LM Ericsson (publ), Stockholm (SE)

(72) Inventors: Gang Zou, Lund (SE); Ashkan Kalantari, Malmö (SE); Fredrik Dahlgren, Lund (SE); Henrik Sjöland, Lund (SE); Sven Karlsson, Malmö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 652 days.

(21) Appl. No.: 18/013,525

(22) PCT Filed: Jul. 10, 2020

(86) PCT No.: PCT/EP2020/069488
§ 371 (c)(1),
(2) Date: Dec. 28, 2022

(87) PCT Pub. No.: WO2022/008062
PCT Pub. Date: Jan. 13, 2022

(65) Prior Publication Data
US 2023/0246668 A1     Aug. 3, 2023

(51) Int. Cl.
*H04B 1/401*     (2015.01)
*G01S 7/00*      (2006.01)
*G01S 7/02*      (2006.01)

(52) U.S. Cl.
CPC ............. *H04B 1/401* (2013.01); *G01S 7/006* (2013.01); *G01S 7/023* (2013.01)

(58) Field of Classification Search
CPC ............. H04W 52/16; H04B 7/06; G01S 7/02
See application file for complete search history.

(56) References Cited

U.S. PATENT DOCUMENTS

2018/0199377 A1     7/2018    Sanderovich et al.
2018/0239438 A1     8/2018    Xue et al.
(Continued)

FOREIGN PATENT DOCUMENTS

WO     2018210427 A1     11/2018
WO     2019084946 A1      5/2019
(Continued)

OTHER PUBLICATIONS

PCT International Search Report, mailed Apr. 15, 2021, in connection with International Application No. PCT/EP2020/069488, all pages.

(Continued)

*Primary Examiner* — Myron Wyche
(74) *Attorney, Agent, or Firm* — Weisberg I.P. Law, P.A.

(57)     ABSTRACT

A wireless communications device that operates in a wireless communications system performs a radar function. This involves obtaining required radio frequency (RF) properties of a radar signal to be used for the radar function, wherein the radar function is one of a plurality of radar functions supported by the wireless communications device, each having a respective one of a plurality of different required RF properties. A transceiver of the wireless communications device is configured to transmit a predefined signal of the wireless communications system using time and frequency resources associated with the predefined signal of the wireless communications system and that satisfy the required RF properties of the radar signal. The configured transceiver is used to transmit the predefined signal of the wireless communications system.

33 Claims, 9 Drawing Sheets

(56)            References Cited

U.S. PATENT DOCUMENTS

| | | | |
|---|---|---|---|
| 2019/0293781 A1 | 9/2019 | Bolin et al. | |
| 2019/0391247 A1 | 12/2019 | Gulati et al. | |
| 2020/0028656 A1 | 1/2020 | Gulati et al. | |
| 2020/0107249 A1 | 4/2020 | Stauffer et al. | |
| 2020/0187126 A1* | 6/2020 | Bolin | ...................... G01S 7/021 |

FOREIGN PATENT DOCUMENTS

| | | | |
|---|---|---|---|
| WO | 2019233830 A1 | 12/2019 | |
| WO | WO2019/233830 | * 12/2019 | .............. H04B 7/06 |

OTHER PUBLICATIONS

PCT Written Opinion, mailed Apr. 15, 2021, in connection with International Application No. PCT/EP2020/069488, all pages.
3GPP TS 38.211 V15.8.0, Dec. 2019, 3rd Generation Partnership Project; Technical Specification Group Radio Access Network; NR; Physical channels and modulation, Release 15, 97 pages.

* cited by examiner

FIG. 1

N physical antenna elements
in an antenna panel

RADAR SIGNAL FOR USE IN MOBILE COMMUNICATION EQUIPMENT

BACKGROUND

The present invention relates to radar functionality in mobile communications equipment, and more particularly to the generation of radar signals by wireless communication equipment.

Radar functionality can be integrated into mmWave communication devices such as 3GPP 5G/NR (New Radio) mmWave phones, herein denoted by the term "user equipment" (UE), by using the device's mmWave RF transceiver as a radar transmitter/receiver. Such integration needs to be aligned with 3GPP standards in order not to disturb existing aspects of 3GPP functionality. For example, steps must be taken to ensure that the radar signal will not introduce radio frequency (RF) interference to a base station or neighbor UEs. However, the current standards lack any strategy for integrating a radar application into 5G/NR systems. There is, therefore, a need to address this and related problems.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Moreover, reference letters may be provided in some instances (e.g., in the claims and summary) to facilitate identification of various steps and/or elements. However, the use of reference letters is not intended to impute or suggest that the so-referenced steps and/or elements are to be performed or operated in any particular order.

In accordance with one aspect of the present invention, the foregoing and other objects are achieved in technology (e.g., methods, apparatuses, nontransitory computer readable storage media, program means) that perform a radar function in a wireless communications device that operates in a wireless communications system. This comprises obtaining required radio frequency (RF) properties of a radar signal to be used for the radar function, wherein the radar function is one of a plurality of radar functions supported by the wireless communications device, each having a respective one of a plurality of different required RF properties. A transceiver of the wireless communications device is configured to transmit a predefined signal of the wireless communications system using time and frequency resources associated with the predefined signal of the wireless communications system and that satisfy the required RF properties of the radar signal. The configured transceiver is then used to transmit the predefined signal of the wireless communications system.

In an aspect of some embodiments consistent with the invention, the predefined signal is a training signal of the wireless communications system.

In another aspect of some of these embodiments, the training signal is a reference signal that is used for synchronization and channel estimation in the wireless communications system.

In an aspect of some embodiments consistent with the invention, the predefined signal is a Sounding Reference Signal, SRS, of the wireless communications system, wherein the SRS is configured for use as a basis for making channel quality estimates.

In another aspect of some embodiments consistent with the invention, performing the radar function in the wireless communication device comprises communicating the required RF properties of the radar signal to a controlling node of the wireless communications system; and receiving, from the controlling node of the wireless communications system, configuration information comprising a transmission power level and the time and frequency resources to be used for transmitting the radar signal.

In an aspect of some embodiments consistent with the invention, the wireless communication device determines a transmission power level and the time and frequency resources to be used for transmitting the radar signal.

In an aspect of some embodiments consistent with the invention, performing the radar function in the wireless communication device comprises selecting one of a plurality of available antenna panels of the wireless communications device, wherein using the configured transceiver to transmit the predefined signal of the wireless communications system comprises transmitting the predefined signal of the wireless communications system using the selected one of the plurality of available antenna panels.

In an aspect of some embodiments consistent with the invention, performing the radar function in the wireless communication device comprises selecting one of a plurality of beam configurations of the selected one of the plurality of available antenna panels, wherein using the configured transceiver to transmit the predefined signal of the wireless communications system comprises transmitting the predefined signal of the wireless communications system using the selected one of the plurality of beam configurations.

In an aspect of some embodiments consistent with the invention, time resources to be used for transmitting the radar signal are time resources associated with training signal transmissions in the wireless communications system.

In an aspect of some embodiments consistent with the invention, the time and frequency resources that satisfy the required RF properties of the radar signal are selected based at least in part on environmental conditions of the wireless communications device.

In an aspect of some embodiments consistent with the invention, the time and frequency resources allocated for transmission of the radar signal include one or more of:

a time period of the radar signal;

a number of symbols to be transmitted in the radar signal;

a frequency bandwidth of the radar signal;

a frequency offset of a carrier signal;

a transmission power of the radar signal.

In an aspect of some embodiments consistent with the invention, the radar signal is a radar reference signal that is not used for any other purpose in the wireless communications system and that is allocated by a controlling node in the wireless communications system.

In an aspect of some embodiments consistent with the invention, the radar reference signal is transmitted as a pulse train; and the wireless communications device performs receiver operations during intervals in-between transmissions of the radar reference signal pulses.

In an aspect of some embodiments of another class of technology consistent with the invention, a controlling node of a wireless communications system supports a radar function performed by a wireless communications device in the wireless communications system. The comprises the controlling node receiving information indicating required radio frequency (RF) properties of a first radar signal to be transmitted by the wireless communications device, wherein the radar function is one of a plurality of radar functions supported by the wireless communications device, each having a respective one of a plurality of different required RF properties. a radar signal transmission configuration is selected from a plurality of different radar signal transmission configurations and information indicating the selected radar signal transmission configuration is communicated to the wireless communications device, wherein each of the plurality of different radar signal transmission configurations defines a transmission power level and time and frequency resources associated with a predefined signal of the wireless communications system, and wherein selecting the radar signal transmission configuration is based on one or more of:

a frequency bandwidth required by the indicated required RF properties of the first radar signal to be transmitted by the wireless communications device;

an extent to which transmission of the first radar signal by the wireless communications device will interfere with receiver operations of one or more other wireless devices;

whether the wireless communications device is to concurrently transmit a second radar signal along with the radar signal;

whether a radar mode indicated by the received information is permitted to be performed at a current location of the wireless communications device.

In an aspect of some embodiments consistent with the invention, when the wireless communications device is to concurrently transmit the second radar signal along with the first radar signal, the information indicating the selected radar signal transmission configuration further identifies first and second antenna panels of the wireless communications device that are to be used for transmission of the respective first and second radar signals.

In an aspect of some embodiments consistent with the invention, selecting the radar signal transmission configuration is based on one or more of:

a required range of the radar function;

a required degree of resolution of range detection of the radar function; and a required accuracy of the radar function.

BRIEF DESCRIPTION OF THE DRAWINGS

The objects and advantages of the invention will be understood by reading the following detailed description in conjunction with the drawings in which:

FIG. 1 illustrates an example of the basic time/frequency structure of a Sounding Reference Signal.

DETAILED DESCRIPTION

Figure 2:
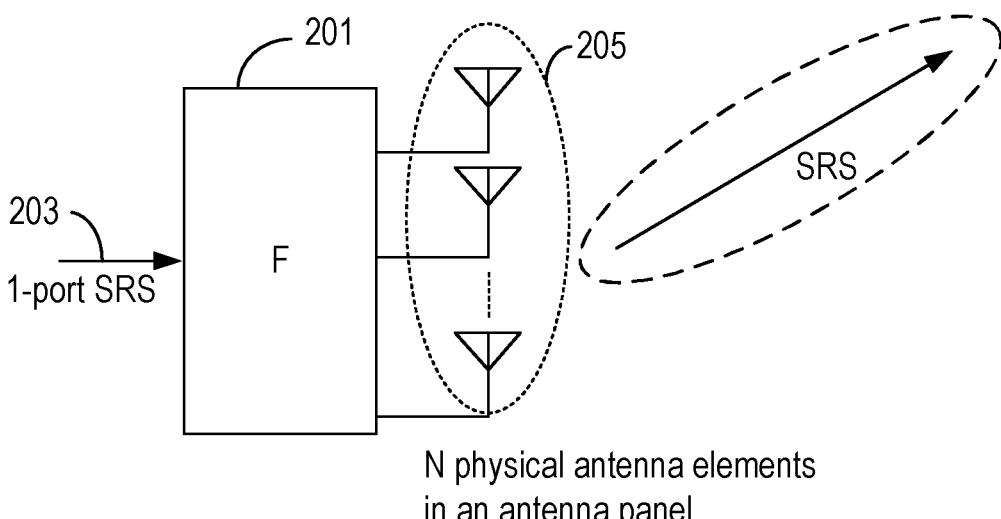
FIG. 2 is a block diagram showing an example in which a filter maps 1 SRS port to some number, N, physical antenna elements in an antenna panel.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits alone, one or more programmed processors, or any combination of these). Moreover, the invention can additionally be considered to be embodied entirely within any form of nontransitory computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

An aspect of the herein-described technology involves utilizing the existing 3GPP NR framework regarding a predefined signal of the communication system (e.g., a UE Sounding reference signal (SRS)) as a basis for allocating radio resources for use as a UE radar signal when implementing radar functionality in a 3GPP UE. In an aspect of the technology, a base station allocates some of the system RF resources in terms of time, frequency, transmission power, and the like to a UE for use as a radar signal. Because the communication resources that are borrowed for radar functionality are designed to work alongside other components in the system, interference to base stations and other UEs from the radar signal can be avoided. As used herein, the term "radar" refers to a type of sensing in which one or more radiofrequency signals are transmitted (by one or more transmitters) into a sensing environment, and reflections of those signals received (by one or more receivers). An analysis of the received reflection signals provides information about objects that the signals reflected off of in the sensing environment.

To illustrate various aspects of embodiments consistent with the invention, the following discussion utilizes a Sounding Reference Signal (SRS) as an example of the type of predefined signal that can be adapted for use as a radar signal. However, this is a non-limiting example. It will be appreciated that other types of predefined signals, such as those that are typically used as training or reference signals for synchronization and/or channel estimation can be used instead.

Figure 1:
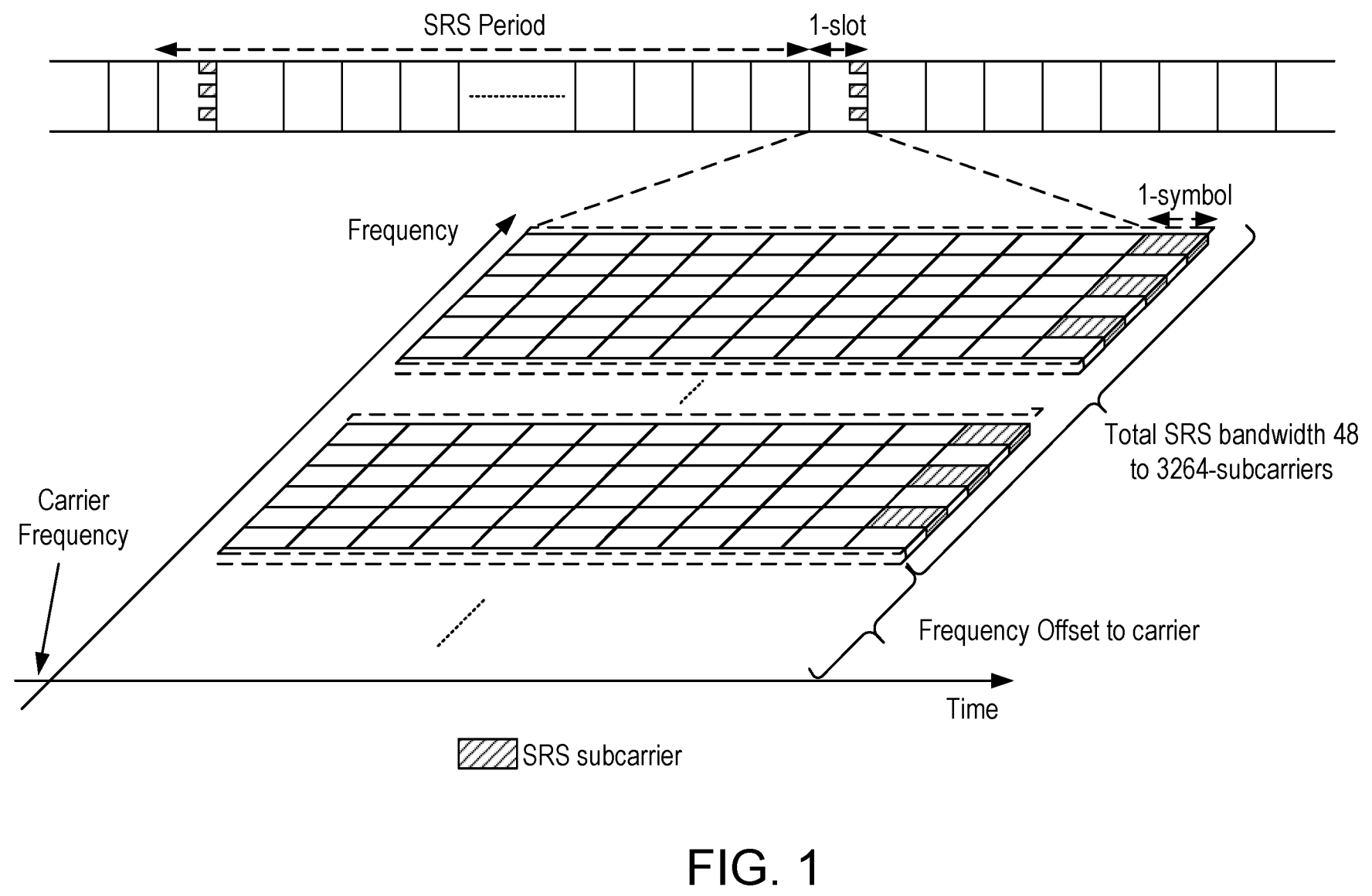

According to the 3GPP 5G/NR standard, a 5G/NR device can be configured to transmit an SRS to enable uplink channel sounding at the base station. The detailed SRS specification can be found in 3GPP TS 38.211 v15.7.0 Section 6.4.1.4 3rd Generation Partnership Project: Technical Specification Group Radio Access Network; NR; Physical channels and modulation (Release 15) December 2019. One example of the basic time/frequency structure of an SRS is shown in FIG. 1. In the general case, an SRS may span one, two, or four consecutive OFDM symbols and be located within the last six symbols of a slot. In the frequency domain, an SRS has a comb structure, where an SRS is transmitted on every "N-th" subcarrier where "N" can take the values of two or four. (In FIG. 1, N=2 is illustrated.) The sequence applied to the set of SRS resource elements are based on an extended Zadoff-Chu sequence. SRS can be configured for periodic, semi-persistent, or aperiodic transmission. In this respect:

A periodic SRS is transmitted with a certain configured periodicity and a certain configured slot offset within that periodicity;

A semi-persistent SRS has a configured periodicity and slot offset in the same way as a periodic SRS. However, actual SRS transmission according to the configured periodicity and slot offset is activated and deactivated by means of Medium Access Control (MAC) Control Element (CE) signaling;

An aperiodic SRS is only transmitted when explicitly triggered by means of Downlink Channel Information (DCI).

For a radar application, the most important SRS configuration is the RF bandwidth. In the 3GPP technical specification Rel. 15, the SRS bandwidth has a range from 4 physical resource blocks (PRBs) to 272 PRBs. In the case of a 120 kHz subcarrier space, this corresponds to a bandwidth from 5.76 MHz to 392 MHz.

Figure 3:
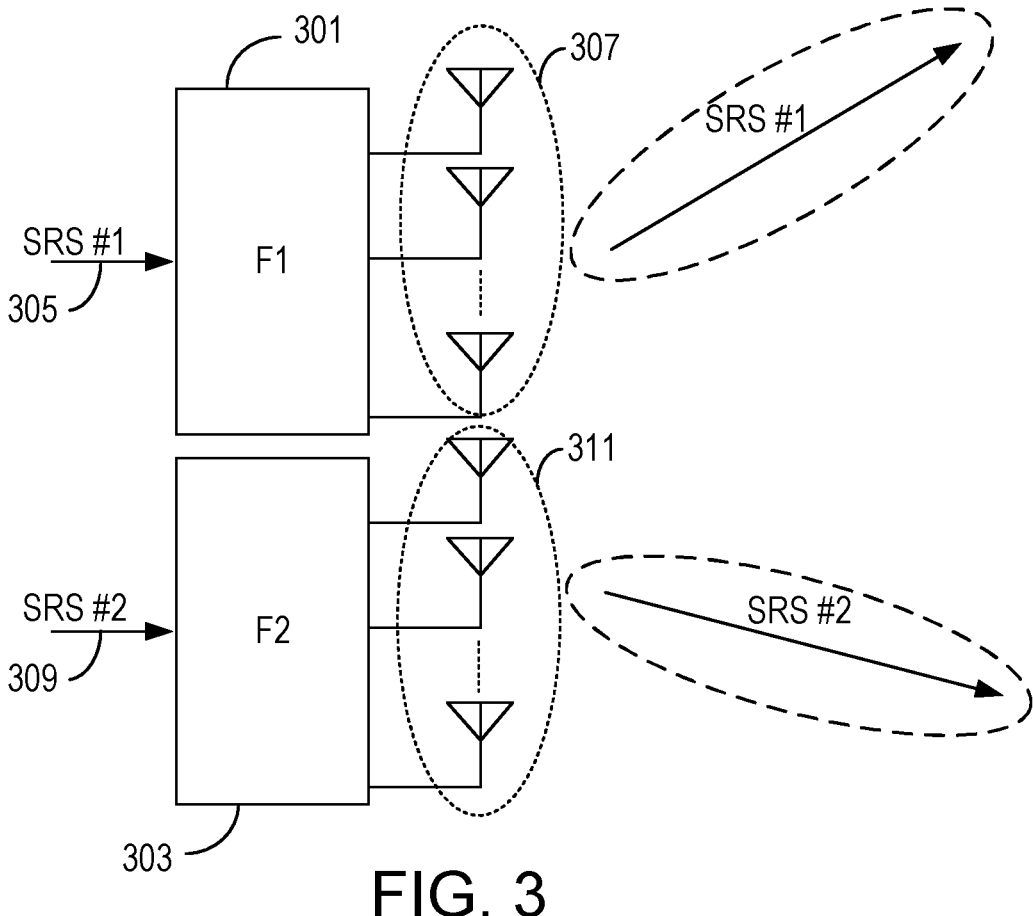
FIG. 3 is a block diagram of an arrangement having a first filter and a second filter.

SRS ports are often not mapped directly to the device physical antennas but via some spatial filter that maps "M" SRS ports to "N" physical antennas. FIG. 2 illustrates this point with an example in which a filter 201 maps 1 SRS port 203 to some number, N, physical antenna elements 205 in an antenna panel. NR devices supporting mmWave frequency operation typically include multiple antenna panels pointing in different directions. Mapping of SRS to one such panel is an example of a transformation from SRS antenna ports to the set of physical antennas. Transmission from different panels will then correspond to different spatial filters. This is illustrated in FIG. 3, which shows an arrangement having a first filter 301 and a second filter 303. The first filter 301 maps a first SRS port 305 to antenna elements in a first antenna panel 307. The second filter 303 maps a second SRS port 309 to antenna elements in a second antenna panel 311.

Aspects of various embodiments consistent with the invention will now be described in which an SRS is used as an example of the type of predefined signal of the wireless communications system that can be configured for use as a radar signal. As previously mentioned, other types of predefined signals can be used in alternative embodiments. In all such embodiments, RF interference is avoided and compliance with the applicable communications standard (e.g., 3GPP telecommunications standard) is maintained by using base station-allocated time and frequency resources for the transmission and reception of radar signals using a UE's 5G transceiver.

In one class of exemplary embodiments ("3GPP network transparent scenario"), the radar application of the UE is transparent to the 3GPP network. In such embodiments, the base station configures a wide bandwidth (e.g., 80 Physical Resource Blocks—PRBs—with 120 kHz subcarriers for a total of 115.2 MHz, or alternatively simply the maximum bandwidth of 272 PRBs, i.e., 392 MHz) for SRS usage and configures scheduled periodic SRS transmissions for a UE once the UE is in RRC_CONNECTED mode (RRC_Connected is a 3GPP term referring to a state in which a UE is actively connected to a base station).

Figure 4:
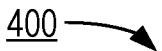
FIG. 4 is, in one respect, a flowchart of actions performed by a UE in accordance with exemplary embodiments corresponding to the 3GPP network transparent scenario.
Figure 4:
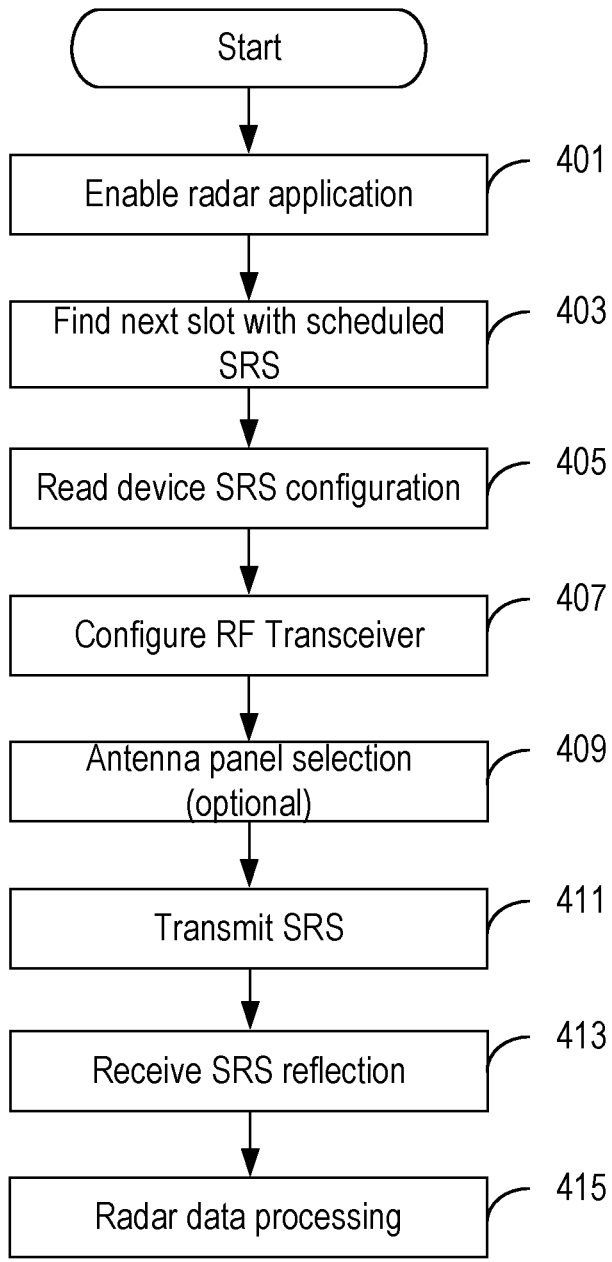

FIG. 4 is, in one respect, a flowchart of actions performed by a UE in accordance with exemplary embodiments corresponding to the 3GPP network transparent scenario. In another respect, the blocks depicted in FIG. 4 can also be considered to represent means 400 (e.g., hardwired or programmable circuitry or other processing means) for carrying out the described actions.

The illustrated embodiment begins with the radar application in the UE being enabled (step 401). The UE identifies the next scheduled time slot allocated for an SRS transmission (step 403), reads the device's SRS configuration (step 405) and configures its transceiver accordingly (step 407). In some but not necessarily all embodiments, the UE also selects one of a plurality of available antenna panels to use (step 409).

The SRS signal (configured as above) is transmitted during the previously scheduled SRS slot (step 411). This transmission constitutes transmission of a radar signal.

In the illustrated embodiment, the UE then operates its receiver to receive reflections of the transmitted SRS signal (step 413). The received reflection signal may then be processed in accordance with the radar application (step 415). These steps may be omitted if a different device is to receive and process the reflection signal (e.g., in a bistatic radar configuration).

It is noted that, although the actions of transmitting the SRS signal (step 411) and receiving its reflections (step 413) are illustrated as being performed in sequence, there is no requirement for this. In embodiments in which the UE is capable of transmitting and receiving at the same time, the transmitting and receiving steps (411 and 413) can be performed during overlapping time periods.

In an alternative class of exemplary embodiments ("Radar-aware base station"), a base station is implemented with UE radar awareness. One application example is an indoor scenario where it would be easier to deploy an upgraded base station revision without being too disruptive of the broad cellular deployment.

In one embodiment according to the radar-aware base station scenario, UE radar function can be reported to the base station as part of its UE capability. The UE can send a request to the base station for its radar application, and the base station can acknowledge the request and allocate an SRS radio resource for the UE to use as a radar signal. (This is discussed in further detail below.)

In another embodiment, the base station has a pre-configured SRS setting for UE radar applications, which can be conveyed to UE by RRC commands when the UE is powered ON and connected to the network.

The following is a list of a few aspects that a base station can consider when allocating radio resources to SRS which UE uses for radar applications:

SRS bandwidth: A base station may allocate a wider bandwidth to the SRS when it is to be used for a radar application than the bandwidth allocated for usual cases. For example, the maximum SRS bandwidth can be allocated when the base station knows the rest of UEs in the cell are in RRC IDLE/INACTIVE mode (RRC IDLE and RRC INACTIVE are states in which a UE is switched on but does not have any established RRC connection).

SRS transmission power: A base station can control the UE transmission power for an SRS radar signal to have a much lower level than a normal transmission power of an SRS in order to avoid having the radar signal interfere with RF signals from other UEs. On the other hand, the base station can allow a higher power for a radar SRS signal if it will not interfere with RF signals from other UEs.

SRS beamforming: A base station may permit a UE to transmit multiple SRS signals and map them in different antenna panels so that an SRS beam can be formed in different directions.

UE Radar Duty Cycle: A base station may require the UE to set the permissible interval for the duty cycle of its radar signal to a shorter amount to minimize the overall amount of generated interference to other receivers. And conversely, a base station may allow a longer interval for an SRS radar signal if it will not interfere with other UEs.

UE Radar Mode: A base station may need to indicate a permissible set of radar modes (e.g., Doppler mode, Frequency-Modulated Continuous-Wave (FMCW) mode and advanced Waveform control) that can be tolerated within the radar interference range which may be more extensive than the usable radar range.

UE Radar Interference Fence—The extent of the geographic area, within the total coverage area of the base station, within which it is acceptable for a UE to use a radar function.

Other aspects, such as but not limited to radar multi-static operations, secure power wave signatures (e.g. watermarked radar waves), and the like.

As mentioned above, different UE radar applications may require correspondingly different RF properties of the radar signal to achieve different operating performance. For example, a UE radar application may need a wide bandwidth radar signal to increase the resolution of the range detection, or it may need a longer duration radar signal to increase the accuracy of the range detection when there is no relative movement between the radar target and the UE, or it may request different frequency bands. In one embodiment, the UE may extract the required RF properties of its radar signal from the application layer and report the information to the base station. The base station can schedule/allocate SRS radio resources accordingly. In some embodiments, such requested properties are changed depending on the context, dynamic needs of the UE, or the radar application. Therefore, RF properties of the radar signal may be changed frequently. In another embodiment, the requested properties would remain the same over longer periods.

In another embodiment, the base station may share the allocated SRS properties of UE(s) with other UE(s).

In another embodiment, the radar application layer of one UE may request/fetch the SRS properties from the base station.

The radar-related signaling 500 between a UE and a cellular network will now be described with reference to FIG. 5. When a UE 501 with radar functionality connects to a 3GPP cellular network (e.g., via a base station 503), the following procedure is followed:

After a UE 501 establishes a connection to a network (step 505), it reports its radar functionality (i.e., capabilities with respect to radar functions) to a base station 503 (step 507). The base station 503 will maintain this information for future reference.

When a radar application is initialized, the UE 501 extracts the required RF properties of the radar signal from the application layer (step 509) and reports these to the base station 503 and requests SRS transmission for the radar application (step 511). The UE 501 can send this information to the base station 503 using either an uplink (UL) control channel or UL data channel signals.

In response to the UE's request and radar signal information, the base station 503 allocates SRS RF resources to the UE 501, including SRS period, number of symbols, frequency bandwidth, frequency offset of the carrier, transmission power, and the like (step 513). Then, the base station 503 sends out RRC Connection Reconfiguration commands to update the SRS configuration in the UE 401 (step 515). Thereafter, the base station 503 can send commands via downlink channel information (DCI) commands to enable SRS transmission for the UE 501 (step 517).

The UE 501 then configures its equipment to utilize the allocated SRS configuration (step 519) and transmits the radar signal (step 521) that is produced by the configuration.

Figure 5:
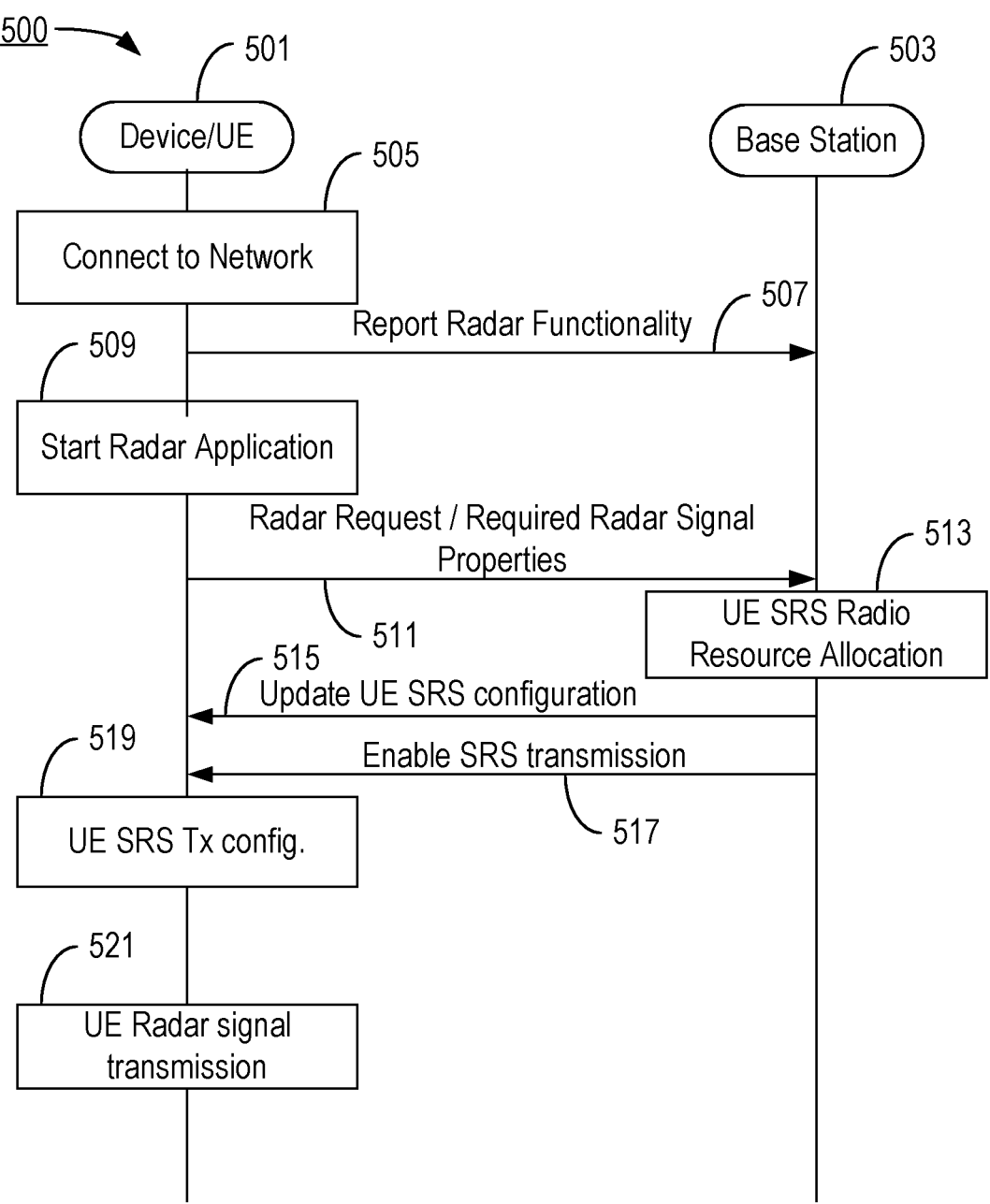
FIG. 5 is a diagram illustrating the radar-related signaling between a UE and a cellular network in accordance with some aspects of technology consistent with the invention.
Figure 6A:
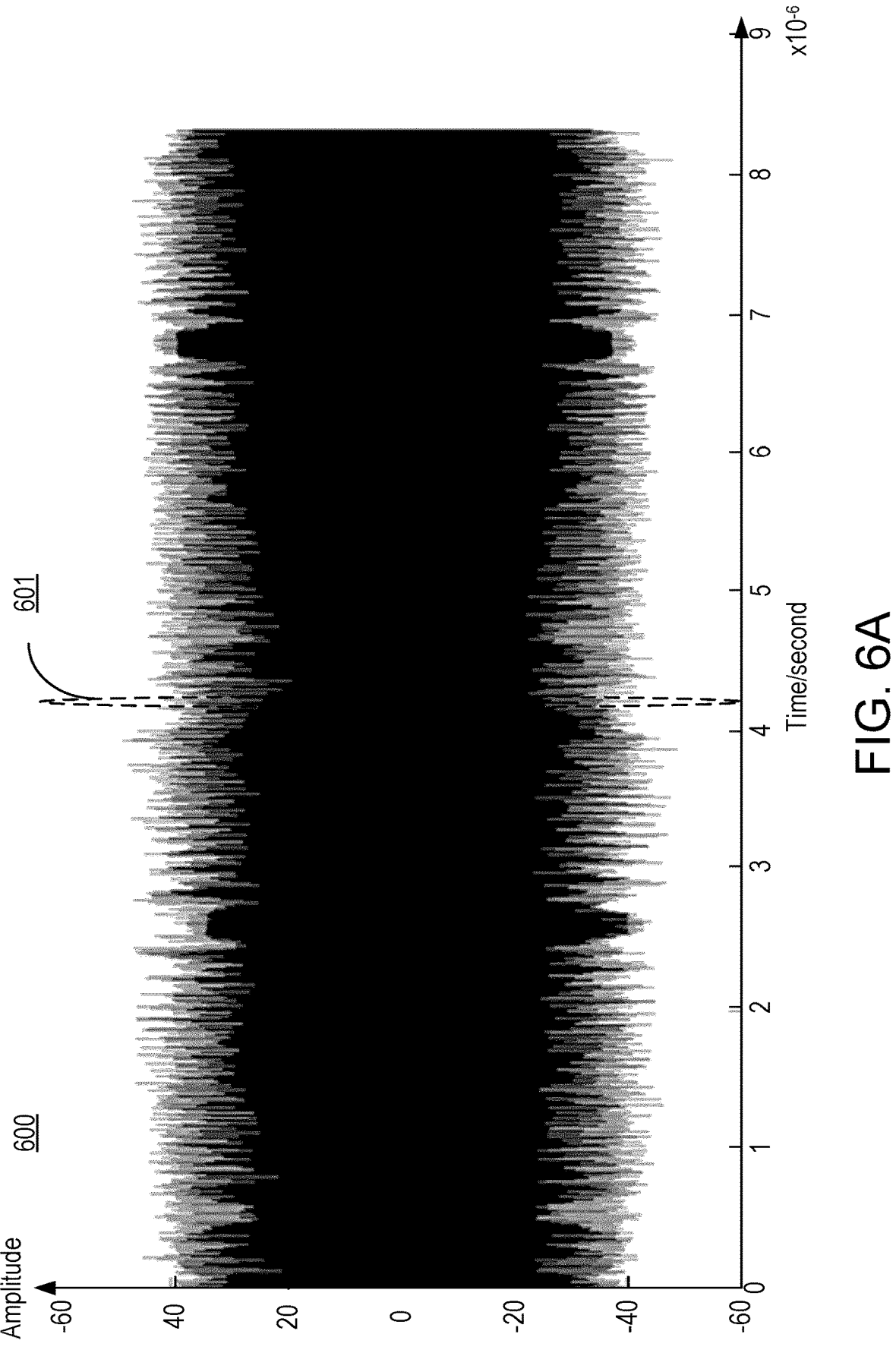
FIG. 6A depicts a simulated SRS waveform that can be used as a radar signal.
Figure 6B:
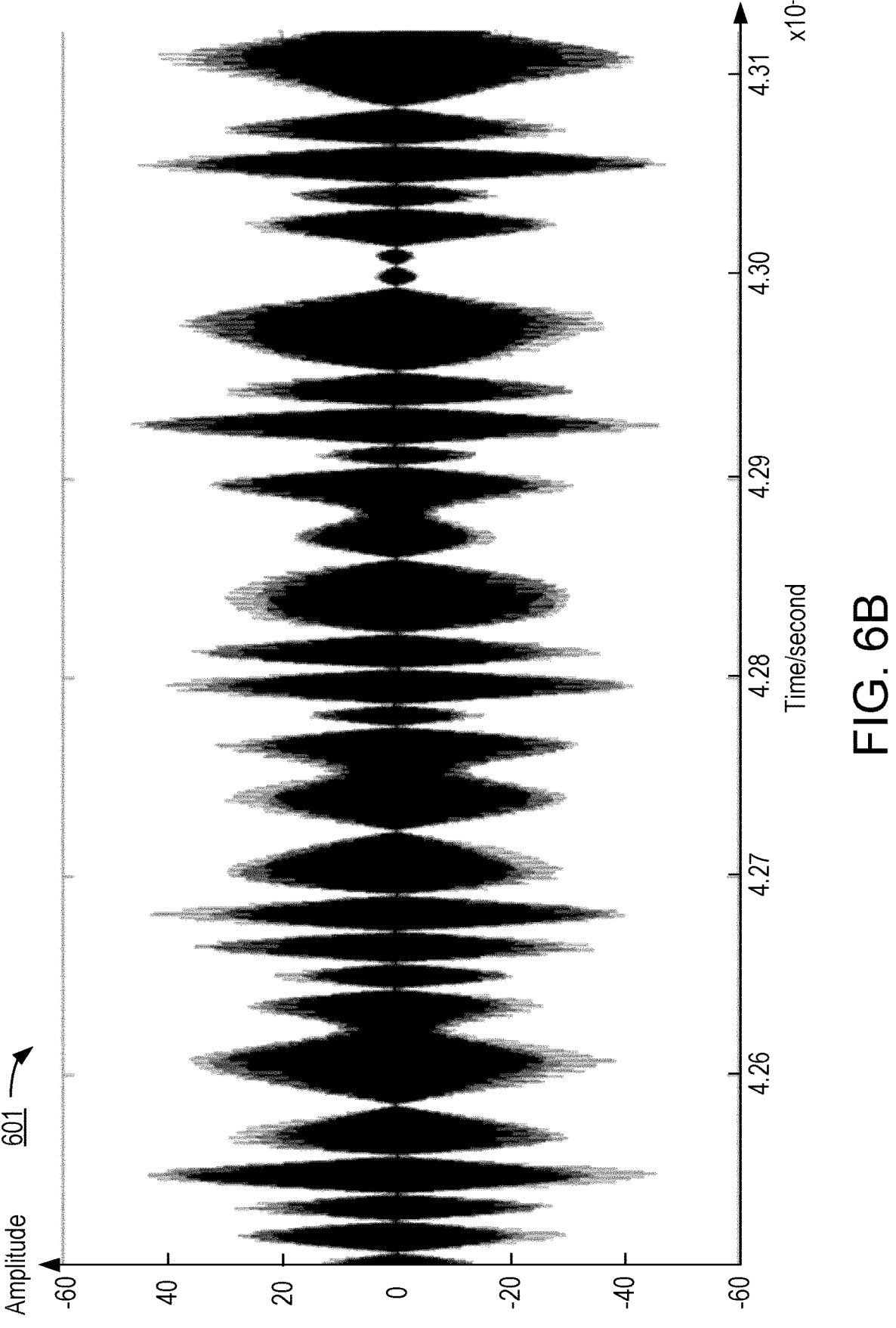
FIG. 6B depicts an enlarged portion of the SRS waveform of FIG. 6A.

To illustrate an aspect embodiments such as the one described with reference to FIG. 5, FIG. 6A depicts a simulated SRS waveform 600 that can be used as a radar signal. To further illustrate the nature of the waveform, a portion 601 of the waveform 600 is shown enlarged in FIG. 6B.

Figure 7:
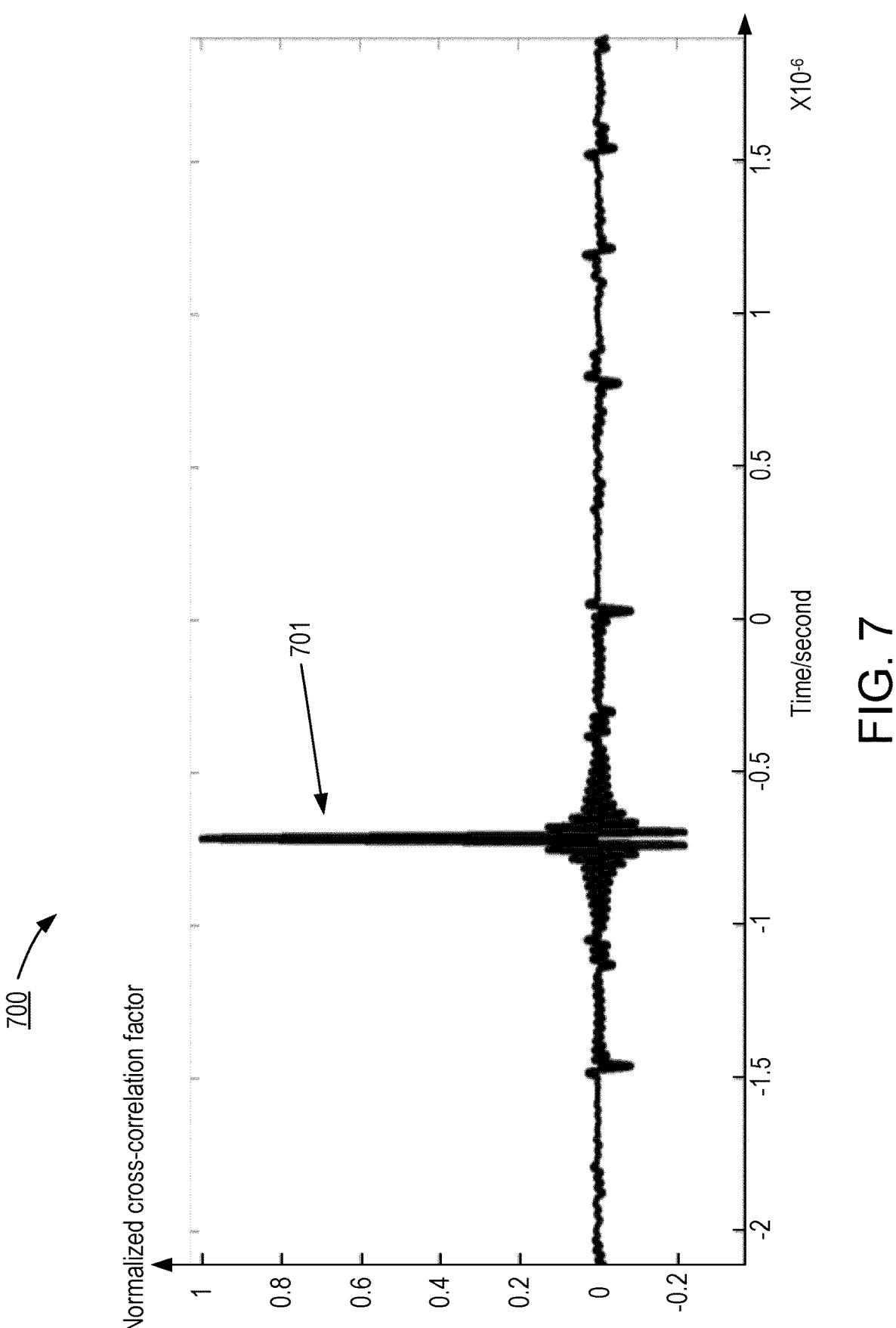
FIG. 7 is a graph illustrating a cross-correlation between a reflection and an original SRS signal.

With the SRS waveform 600 taken as an original transmitted radar signal, FIG. 7 is a graph 700 illustrating a cross-correlation between a reflection and the original SRS signal 600. The x-axis represents the time lags at which the correlations are computed. Here the cross-correlation peak 701 appears at −0.714 μs (i.e., the lag of the SRS backscatter signal vs. its original SRS is 0.714 μs). Therefore, in this example the distance to the target can be estimated as 107 meters (0.714e-6*3e8/2=107).

The prominent peak 701 in the signal illustrates how the configured SRS signal has properties that enable it to effectively be used as a radar signal (i.e., the reflection signal can be recognized with high time accuracy due to the sharp correlation peak).

Figure 8:
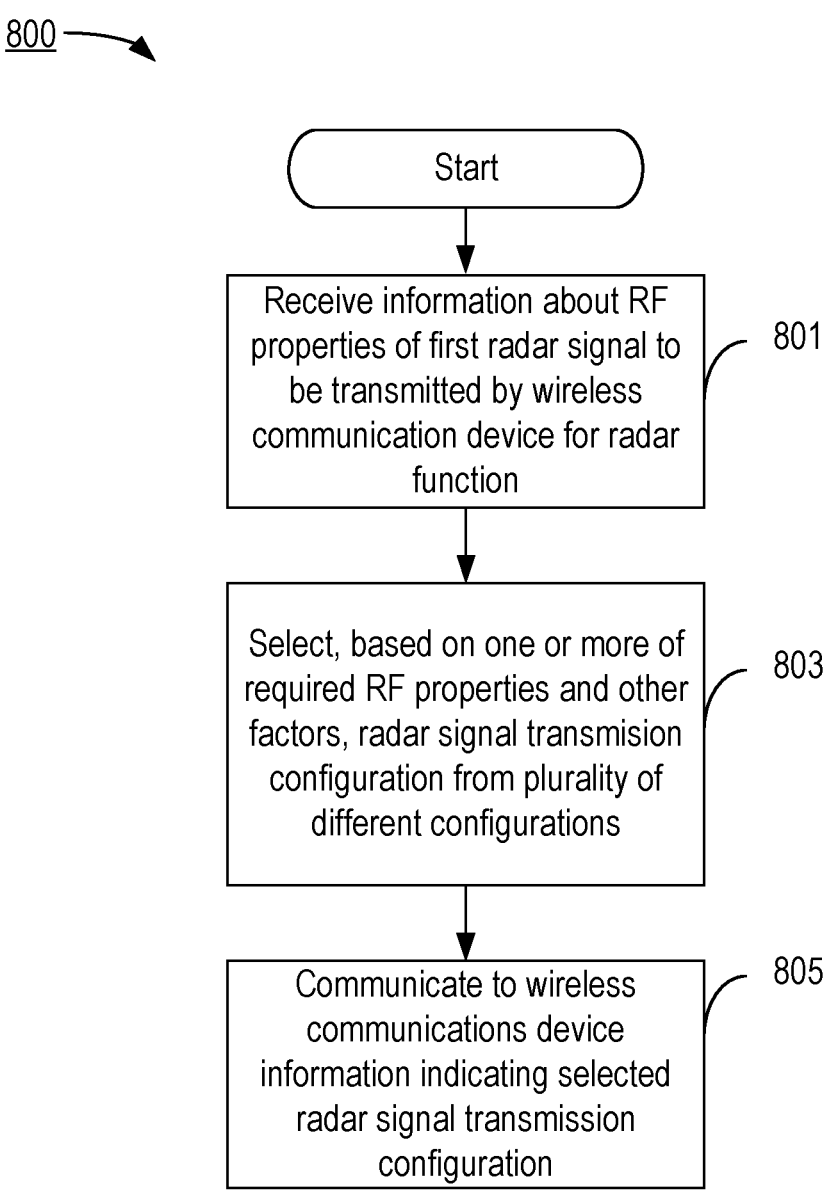
FIG. 8 is, in one respect, a flowchart of actions performed by a radar-aware controlling node of a wireless communication system in accordance with aspects of some exemplary embodiments.

FIG. 8 is, in one respect, a flowchart of actions performed by a radar-aware controlling node (e.g., radar-aware base station) of a wireless communication system in accordance with aspects of some exemplary embodiments. In another respect, the blocks depicted in FIG. 8 can also be considered to represent means 800 (e.g., hardwired or programmable circuitry or other processing means) for carrying out the described actions. The method is for supporting a radar function performed by a wireless communications device in the wireless communications system.

In the illustrated embodiment, the controlling node receives information indicating required radio frequency (RF) properties of a first radar signal to be transmitted by the wireless communications device (step 801), wherein the radar function is one of a plurality of radar functions supported by the wireless communications device, each having a respective one of a plurality of different required RF properties.

A radar signal transmission configuration is then selected from a plurality of different radar signal transmission configurations (step 803). Each of the plurality of different radar signal transmission configurations defines a transmission power level and time and frequency resources associated with a predefined signal of the wireless communications system. Selection can be based on one or more different factors. Such factors can include, without limitation:

a frequency bandwidth required by the indicated required RF properties of the first radar signal to be transmitted by the wireless communications device;

an extent to which transmission of the first radar signal by the wireless communications device will interfere with receiver operations of one or more other wireless devices;

whether the wireless device is to concurrently transmit a second radar signal along with the radar signal; and whether a radar mode indicated by the received information is permitted to be performed at a current location of the wireless communications device.

Information indicating the selected radar signal transmission configuration is then communicated to the wireless communications device (step 805).

Figure 9:
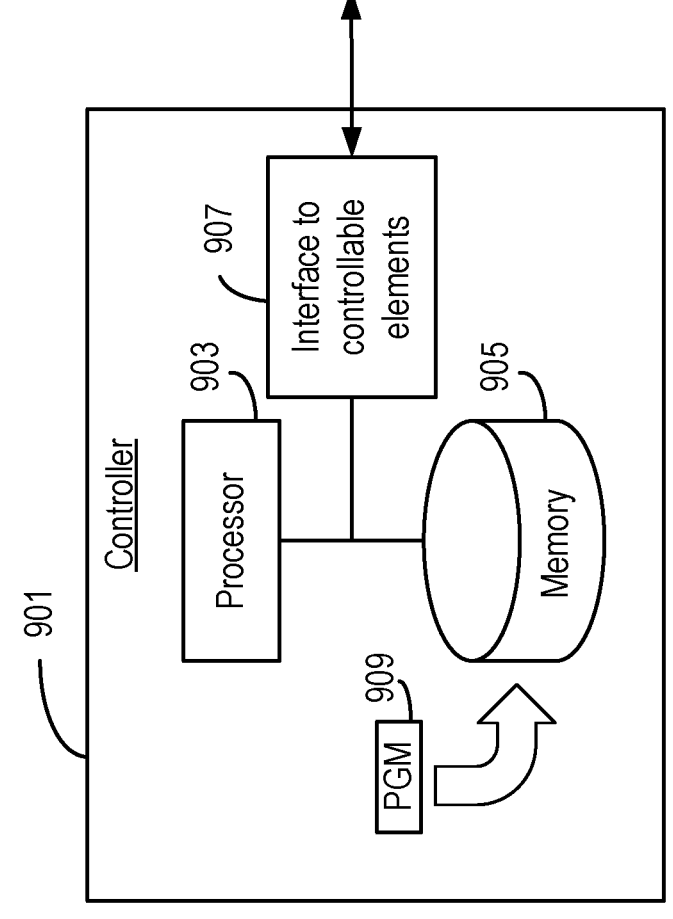
FIG. 9, which illustrates an exemplary controller in accordance with some but not necessarily all exemplary embodiments consistent with the invention.

In another aspect of embodiments consistent with the invention, aspects of an exemplary controller that may be employed to cause any and/or all of the above-described actions to be performed (either in the UE or in a controlling node) as discussed herein in the various embodiments is shown in FIG. 9, which illustrates an exemplary controller 901 in accordance with some but not necessarily all exemplary embodiments consistent with the invention. In particular, the controller 901 includes circuitry configured to carry out any one or any combination of the various functions described above (e.g., as illustrated in any one or more of FIGS. 4, 5, and 8). Such circuitry could, for example, be entirely hard-wired circuitry (e.g., one or more Application Specific Integrated Circuits—"ASICs"). Depicted in the exemplary embodiment of FIG. 9, however, is programmable circuitry, comprising a processor 903 coupled to one or more memory devices 905 (e.g., Random Access Memory, Magnetic Disc Drives, Optical Disk Drives, Read Only Memory, etc.) and to an interface 907 that enables a UE to transmit a radar signal configured from a predefined signal of the communication system (e.g., an SRS signal) as discussed herein. The memory device(s) 905 store program means 909 (e.g., a set of processor instructions) configured to cause the processor 903 to control other system elements so as to carry out any of the aspects described above. The memory device(s) 905 may also store data (not shown) representing various constant and variable parameters as may be needed by the processor 903 and/or as may be generated when carrying out its functions such as those specified by the program means 909.

Turning now to another aspect of embodiments consistent with the invention (also implementable using a controller such as, but not limited to, the one depicted in FIG. 9), the above-described embodiments utilized a predefined signal of the communications system (e.g., an SRS signal) that is configured to serve another purpose (e.g., channel estimation, channel sounding, training, etc.). But in alternative embodiments, in order to further optimize UE radar operation and performance, a specific radar reference signal (RRS) can be introduced into a mmWave communication system.

In the case of a 3GPP cellular system, this requires a change to the existing 3GPP standard to introduce RRS as a new physical-layer level signal. RRS shall be scheduled by the base station and the base station allocates/configures its radio resource.

In one embodiment, RRS signaling can use an enhanced SRS framework to fit UE radar applications. This may include enhancements of SRS frequency offset, bandwidth allocation, schedule timing, transmission power control, and the like. For example, a controlling node (e.g., base station) can allocate a UE radar signal that extends the SRS bandwidth beyond the limits of SRS bandwidths currently specified in the 3GPP standard.

In another embodiment, a UE can generate RRS as a pulse train signal. This creates an opportunity for the UE to switch from transmission to reception modes in-between the pulses. Therefore, this can avoid the need for a UE to be capable of transmitting and receiving at overlapping time periods (e.g., simultaneously).

The various embodiments consistent with the invention provide a number of advantages over conventional technology. One of these is low cost: only a slight modification to the already available 5G modem is required to adapt it for use as a radar device.

Further, the inventive technology builds upon the existing 3GPP NR standard and hence is in compliance with it.

Moreover, the inventive technology enables co-existence between radar and 5G communication activities.

The invention has been described with reference to particular embodiments. However, it will be readily apparent to those skilled in the art that it is possible to embody the invention in specific forms other than those of the embodiment described above. Thus, the described embodiments are merely illustrative and should not be considered restrictive in any way. The scope of the invention is further illustrated by the appended claims, rather than only by the preceding description, and all variations and equivalents which fall within the range of the claims are intended to be embraced therein.

The invention claimed is:

1. A method of operating a radar function in a wireless communications device in a wireless communications system, the method comprising:

obtaining required radio frequency (RF) properties of a radar signal to be used for the radar function by extracting the required RF properties from an application layer;

communicating the required RF properties of the radar signal to a controlling node of the wireless communications system;

receiving, from the controlling node of the wireless communications system, configuration information indicating a transmission power level and time and frequency resources associated with the radar signal;

configuring a transceiver of the wireless communications device to transmit a predefined signal of the wireless communications system using time and frequency resources associated with the predefined signal of the wireless communications system and that satisfy the required RF properties of the radar signal; and transmitting, by the configured transceiver, the predefined signal of the wireless communications system as the radar signal.

2. The method of claim 1, wherein the predefined signal is a training signal of the wireless communications system.

3. The method of claim 2, wherein the training signal is a reference signal that is used for synchronization and channel estimation in the wireless communications system.

4. The method of claim 1, wherein the predefined signal is a Sounding Reference Signal (SRS) of the wireless communications system, wherein the SRS is configured for use as a basis for making channel quality estimates.

5. The method of claim 1, wherein the wireless communication device determines a transmission power level and the time and frequency resources to be used for transmitting the radar signal.

6. The method of claim 1, further comprising:
selecting one of a plurality of available antenna panels of the wireless communications device,
wherein using the configured transceiver to transmit the predefined signal of the wireless communications system comprises transmitting the predefined signal of the wireless communications system using the selected one of the plurality of available antenna panels.

7. The method of claim 6, further comprising:
selecting one of a plurality of beam configurations of the selected one of the plurality of available antenna panels,
wherein using the configured transceiver to transmit the predefined signal of the wireless communications system comprises transmitting the predefined signal of the wireless communications system using the selected one of the plurality of beam configurations.

8. The method of claim 1, wherein time resources to be used for transmitting the radar signal are time resources associated with training signal transmissions in the wireless communications system.

9. The method of claim 1, wherein the time and frequency resources that satisfy the required RF properties of the radar signal are selected based at least in part on environmental conditions of the wireless communications device.

10. The method of claim 1, wherein the time and frequency resources allocated for transmission of the radar signal include one or more of:
a time period of the radar signal;
a number of symbols to be transmitted in the radar signal;
a frequency bandwidth of the radar signal;
a frequency offset of a carrier signal;
a transmission power of the radar signal.

11. The method of claim 1, wherein the radar signal is a radar reference signal that is not used for any other purpose in the wireless communications system and that is allocated by a controlling node in the wireless communications system.

12. The method of claim 11, wherein:
the radar reference signal is transmitted as a pulse train; and
the wireless communications device performs receiver operations during intervals in-between transmissions of the radar reference signal pulses.

13. A method performed by a controlling node of a wireless communications system, the method for operating a radar function performed by a wireless communications device in the wireless communications system, the method comprising:
receiving required radio frequency (RF) properties extracted for a first radar signal to be transmitted by the wireless communications device, wherein the radar function is one of a plurality of radar functions supported by the wireless communications device, each having a respective one of a plurality of different required RF properties;
selecting a radar signal transmission configuration from a plurality of different radar signal transmission configurations; and
communicating the required RF properties indicating the selected radar signal transmission configuration to the wireless communications device,

each of the plurality of different radar signal transmission configurations defining a transmission power level and time and frequency resources associated with a predefined signal of the wireless communications system, and
the selecting the radar signal transmission configuration is-based on one or more of:
a frequency bandwidth required by the indicated required RF properties of the first radar signal to be transmitted by the wireless communications device;
an extent to which transmission of the first radar signal by the wireless communications device will interfere with receiver operations of one or more other wireless devices;
whether the wireless communications device is to concurrently transmit a second radar signal along with the radar signal;
whether a radar mode indicated by the received information is permitted to be performed at a current location of the wireless communications device.

14. The method of claim 13, wherein:
when the wireless communications device is to concurrently transmit the second radar signal along with the first radar signal, the information indicating the selected radar signal transmission configuration further identifies first and second antenna panels of the wireless communications device that are to be used for transmission of the respective first and second radar signals.

15. The method of claim 13, wherein selecting the radar signal transmission configuration is based on one or more of:
a required range of the radar function;
a required degree of resolution of range detection of the radar function; and
a required accuracy of the radar function.

16. A non-transitory computer readable storage medium comprising instructions that, when executed by at least one processor of a wireless communications device that operates in a wireless communications system, causes the at least one processor to carry out a method of performing a radar function of the wireless communications device, the method comprising:
obtaining required radio frequency (RF) properties of a radar signal to be used for the radar function, by extracting the required RF properties;
communicating the required RF properties of the radar signal to a controlling node of the wireless communications system;
receiving, from the controlling node of the wireless communications system, configuration information defining a transmission power level and time and frequency resources associated with the radar signal;
configuring a transceiver of the wireless communications device to transmit a predefined signal of the wireless communications system using time and frequency resources associated with the predefined signal of the wireless communications system and that satisfy the required RF properties of the radar signal; and
transmitting, by the configured transceiver, the predefined signal of the wireless communications system as the radar signal.

17. A non-transitory computer readable storage medium comprising instructions that, when executed by at least one processor of a controlling node of a wireless communications system, causes the at least one processor to carry out a method of operating a radar function in a wireless communications device in the wireless communications system, the method comprising:

receiving required radio frequency (RF) properties extracted for a first radar signal to be transmitted by the wireless communications device, wherein the radar function is one of a plurality of radar functions supported by the wireless communications device, each having a respective one of a plurality of different required RF properties;

selecting a radar signal transmission configuration from a plurality of different radar signal transmission configurations; and communicating the required RF properties indicating the selected radar signal transmission configuration to the wireless communications device, each of the plurality of different radar signal transmission configurations defining a transmission power level and time and frequency resources associated with a predefined signal of the wireless communications system, and the selecting the radar signal transmission configuration is-based on one or more of:

a frequency bandwidth required by the indicated required RF properties of the first radar signal to be transmitted by the wireless communications device;

an extent to which transmission of the first radar signal by the wireless communications device will interfere with receiver operations of one or more other wireless devices;

whether the wireless communications device is to concurrently transmit a second radar signal along with the radar signal;

whether a radar mode indicated by the received information is permitted to be performed at a current location of the wireless communications device.

18. A wireless communications device configured to operate in a wireless communications system, and further configured to perform a radar function, the wireless communications device comprising:

circuitry configured to obtain required radio frequency (RF) properties of a radar signal to be used for the radar function, by extracting the required RF properties;

circuitry configured to communicate the required RF properties of the radar signal to a controlling node of the wireless communications system;

circuitry configured to receive, from the controlling node of the wireless communications system, configuration information comprising a transmission power level and time and frequency resources to be used for transmitting the radar signal;

circuitry configured to configure a transceiver of the wireless communications device to transmit a predefined signal of the wireless communications system using time and frequency resources associated with the predefined signal of the wireless communications system and that satisfy the required RF properties of the radar signal; and circuitry configured to transmit, by the configured transceiver, the predefined signal of the wireless communications system as the radar signal.

19. The wireless communication device of claim 18, wherein the predefined signal is a training signal of the wireless communications system.

20. The wireless communication device of claim 19, wherein the training signal is a reference signal that is used for synchronization and channel estimation in the wireless communications system.

21. The wireless communication device of claim 18, wherein the predefined signal is a Sounding Reference Signal (SRS) of the wireless communications system, wherein the SRS is configured for use as a basis for making channel quality estimates.

22. The wireless communication device of claim 18, wherein the wireless communication device determines a transmission power level and the time and frequency resources to be used for transmitting the radar signal.

23. The wireless communication device of claim 18, further comprising:

circuitry configured to select one of a plurality of available antenna panels of the wireless communications device, wherein the circuitry configured to use the configured transceiver to transmit the predefined signal of the wireless communications system comprises circuitry configured to transmit the predefined signal of the wireless communications system using the selected one of the plurality of available antenna panels.

24. The wireless communication device of claim 23, further comprising:

circuitry configured to select one of a plurality of beam configurations of the selected one of the plurality of available antenna panels, wherein the circuitry configured to use the configured transceiver to transmit the predefined signal of the wireless communications system comprises circuitry configured to transmit the predefined signal of the wireless communications system using the selected one of the plurality of beam configurations.

25. The wireless communication device of claim 18, wherein time resources to be used for transmitting the radar signal are time resources associated with training signal transmissions in the wireless communications system.

26. The wireless communication device of claim 18, wherein the time and frequency resources that satisfy the required RF properties of the radar signal are selected based at least in part on environmental conditions of the wireless communications device.

27. The wireless communication device of claim 18, wherein the time and frequency resources allocated for transmission of the radar signal include one or more of:

a time period of the radar signal;

a number of symbols to be transmitted in the radar signal;

a frequency bandwidth of the radar signal;

a frequency offset of a carrier signal;

a transmission power of the radar signal.

28. The wireless communication device of claim 18, wherein the radar signal is a radar reference signal that is not used for any other purpose in the wireless communications system and that is allocated by a controlling node in the wireless communications system.

29. The wireless communication device of claim 28, wherein:

the radar reference signal is transmitted as a pulse train; and the wireless communications device is configured to perform receiver operations during intervals in-between transmissions of the radar reference signal pulses.

30. The wireless communication device of claim 18, wherein the communication device is a mm-Wave communication device.

31. A controlling node of a wireless communications system, the controlling node configured to support a radar function performed by a wireless communications device in the wireless communications system, the controlling node comprising:

circuitry configured to receive required radio frequency (RF) properties extracted for a first radar signal to be transmitted by the wireless communications device, wherein the radar function is one of a plurality of radar functions supported by the wireless communications device, each having a respective one of a plurality of different required RF properties;

circuitry configured to select a radar signal transmission configuration from a plurality of different radar signal transmission configurations; and circuitry configured to communicate the required RF properties indicating the selected radar signal transmission configuration to the wireless communications device, each of the plurality of different radar signal transmission configurations defining a transmission power level and time and frequency resources associated with a predefined signal of the wireless communications system, and the circuitry configured to select the radar signal transmission configuration is configured to make a signal transmission configuration selection based on one or more of:

a frequency bandwidth required by the indicated required RF properties of the first radar signal to be transmitted by the wireless communications device;

an extent to which transmission of the first radar signal by the wireless communications device will interfere with receiver operations of one or more other wireless devices;

whether the wireless communications device is to concurrently transmit a second radar signal along with the radar signal;

whether a radar mode indicated by the received information is permitted to be performed at a current location of the wireless communications device.

32. The controlling node of claim 31, wherein:

when the wireless communications device is to concurrently transmit the second radar signal along with the first radar signal, the information indicating the selected radar signal transmission configuration further identifies first and second antenna panels of the wireless communications device that are to be used for transmission of the respective first and second radar signals.

33. The controlling node of claim 31, wherein selecting the radar signal transmission configuration is based on one or more of:

a required range of the radar function;

a required degree of resolution of range detection of the radar function; and a required accuracy of the radar function.

* * * * *